United States Patent
Takase et al.

(10) Patent No.: US 9,127,161 B2
(45) Date of Patent: Sep. 8, 2015

(54) METHOD FOR STABILIZING SILANOL-GROUP-CONTAINING POLYSILOXANE SOLUTION, METHOD FOR PRODUCING STABLE SILANOL-GROUP-CONTAINING POLYSILOXANE SOLUTION, AND STABLE SILANOL-GROUP-CONTAINING POLYSILOXANE SOLUTION

(71) Applicant: NISSAN CHEMICAL INDUSTRIES, LTD., Toyko (JP)

(72) Inventors: Kenji Takase, Toyama (JP); Hiroshi Kita, Toyama (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/356,623

(22) PCT Filed: Oct. 23, 2012

(86) PCT No.: PCT/JP2012/077329
§ 371 (c)(1),
(2) Date: May 7, 2014

(87) PCT Pub. No.: WO2013/069449
PCT Pub. Date: May 16, 2013

(65) Prior Publication Data
US 2014/0309317 A1    Oct. 16, 2014

(30) Foreign Application Priority Data
Nov. 8, 2011  (JP) .................. 2011-244554

(51) Int. Cl.
C08K 5/06 (2006.01)
C08L 83/06 (2006.01)
C08G 77/32 (2006.01)
C08L 101/02 (2006.01)
C08G 77/16 (2006.01)

(52) U.S. Cl.
CPC ................. C08L 83/06 (2013.01); C08G 77/32 (2013.01); C08G 77/16 (2013.01); C08K 5/06 (2013.01); C08L 101/02 (2013.01)

(58) Field of Classification Search
CPC ........... C08G 77/16; C08G 77/32; C08K 5/06
USPC .......................................... 523/310; 524/366
See application file for complete search history.

(56) References Cited

U.S. PATENT DOCUMENTS

| 4,704,443 A | 11/1987 | Lamont |
| 5,198,518 A | 3/1993 | Yamamoto et al. |

FOREIGN PATENT DOCUMENTS

| EP | 0 367 492 A2 | 5/1990 |
| EP | 0 698 632 A1 | 2/1996 |
| EP | 1 894 934 A1 | 3/2008 |
| FR | 2 747 683 A1 | 10/1997 |
| JP | 61-16925 A | 1/1986 |
| JP | 63-120738 A | 5/1988 |
| JP | 03-126612 A | 5/1991 |
| JP | 04-180926 A | 6/1992 |
| JP | 09-137061 A | 5/1997 |
| JP | 10-218995 A | 8/1998 |
| JP | 2005-023256 A | 1/2005 |

OTHER PUBLICATIONS

International Search Report issued in PCT/JP2012/077329 dated Feb. 5, 2013.
Extended European Search Report, dated Feb. 18, 2015, for European Application No. 12847849.2.

Primary Examiner — Edward Cain
(74) Attorney, Agent, or Firm — Birch, Stewart, Kolasch & Birch, LLP

(57) ABSTRACT

A silanol-group-containing-polysiloxane solution containing a silanol-group-containing polysiloxane is treated with a cation exchange resin in the presence of an alcohol solvent.

5 Claims, No Drawings

METHOD FOR STABILIZING SILANOL-GROUP-CONTAINING POLYSILOXANE SOLUTION, METHOD FOR PRODUCING STABLE SILANOL-GROUP-CONTAINING POLYSILOXANE SOLUTION, AND STABLE SILANOL-GROUP-CONTAINING POLYSILOXANE SOLUTION

TECHNICAL FIELD

The present invention relates to a method for stabilizing a solution of a silanol-group-containing-polysiloxane solution (hereinafter referred to as "a silanol-group-containing-polysiloxane solution"), to a method for producing a stabilized silanol-group-containing-polysiloxane solution, and to a stabilized silanol-group-containing-polysiloxane solution. More particularly, the invention relates to a method for stabilizing the molecular weight of the silanol-group-containing polysiloxane.

BACKGROUND ART

There has been known a method for producing a silanol-group-containing polysiloxane, which is used as a coating agent or the like for producing, for example, an anti-reflection film, the method including polycondensation of a silicon compound, preferably a siloxane or silane having an Si-bound alkoxy group, in the presence of a polycondensation catalyst.

However, the silanol-group-containing-polysiloxane solution produced through the method has poor storage stability, even after inactivation or removal of the polycondensation catalyst. Specifically, in some cases, the molecular weight of the silanol-group-containing polysiloxane gradually increases. Thus, due to such poor storage stability, storage or transport of the silanol-group-containing-polysiloxane solution may be considerably impeded.

Some methods are known for stabilizing a silanol-group-containing-polysiloxane solution by means of an additive, or modification of the solvent. In one specific method, an alcohol is added before or during polymerization to form a siloxane polymer, to thereby stabilize the viscosity of the siloxane polymer (see Patent Document 1). In another disclosed method, a polar solvent having a small polarization degree and a dielectric constant falling within a specific range is used, to thereby provide a composition containing an organopolysiloxane resin having a silanol group. The composition does not undergo condensation at room temperature, has remarkably excellent storage stability, and does not deteriorate over time (see Patent Document 2). However, through use of an additive (Patent Document 1) or modification of the solvent (Patent Document 2), the produced silanol-group-containing-polysiloxane solution has poor storage stability. Therefore, there is demand for another way of stabilizing the polysiloxane solution.

There is also disclosed a technique for producing a silicon-containing solution whose gelation is suppressed or prevented. This technique employs a hydrous H-type cation exchange resin serving as a catalyst of hydrolyzation and condensation of alkoxysilane (see Patent Document 3). Since the technique disclosed in Patent Document 3 employs a hydrous H-type cation exchange resin serving as a catalyst of polycondensation of alkoxysilane, the silanol-group-containing-polysiloxane solution after completion of polycondensation is not treated with the cation exchange resin.

PRIOR ART DOCUMENTS

Patent Documents

Patent Document 1: Japanese Patent Application Laid-Open (kokai) No. 1997-137061
Patent Document 2: Japanese Patent Application Laid-Open (kokai) No. 1998-218995
Patent Document 3: Japanese Patent Application Laid-Open (kokai) No. 1991-126612

SUMMARY OF THE INVENTION

Problems to be Solved by the Invention

An object of the present invention is to solve problems involved in the aforementioned conventional techniques. More specifically, an object of the invention is to provide a method for stabilizing a silanol-group-containing-polysiloxane solution, which method can remarkably enhance the storage stability of the solution. Another object of the invention is to provide a method for producing a stabilized silanol-group-containing-polysiloxane solution. Still another object of the invention is to provide a stabilized silanol-group-containing-polysiloxane solution.

Means for Solving the Problems

The present inventors have conducted extensive studies in order to attain the aforementioned objects, and have found that the variation in molecular weight of a silanol-group-containing polysiloxane can be remarkably suppressed by treating the solution with a cation exchange resin in the presence of an alcohol solvent. That is, the storage stability of a silanol-group-containing-polysiloxane solution can be remarkably enhanced by treating the solution with a cation exchange resin in the presence of an alcohol solvent. The present invention has been accomplished on the basis of this finding.

Accordingly, the present invention provides the following.

1. A method for stabilizing a silanol-group-containing-polysiloxane solution, which method comprises treating a silanol-group-containing-polysiloxane solution containing a silanol-group-containing polysiloxane with a cation exchange resin in the presence of an alcohol solvent.
2. A method for stabilizing a silanol-group-containing-polysiloxane solution as described in 1 above, wherein the alcohol solvent is a polyhydric alcohol monoether solvent.
3. A method for stabilizing a silanol-group-containing-polysiloxane solution as described in 1 above, wherein the alcohol solvent is propylene glycol monoalkyl ether.
4. A method for stabilizing a silanol-group-containing-polysiloxane solution as described in 1 above, wherein the alcohol solvent is at least one species selected from among propylene glycol monomethyl ether and propylene glycol monoethyl ether.
5. A method for producing a stabilized silanol-group-containing-polysiloxane solution, which method comprises treating a silanol-group-containing-polysiloxane solution containing a silanol-group-containing polysiloxane with a cation exchange resin in the presence of an alcohol solvent.
6. A stabilized silanol-group-containing-polysiloxane solution, which solution is produced by treating a silanol-group-containing-polysiloxane solution containing a silanolgroup-containing polysiloxane with a cation exchange resin in the presence of an alcohol solvent.

Effects of the Invention

According to the present invention, a silanol-group-containing-polysiloxane solution is treated with a cation exchange resin in the presence of an alcohol solvent, whereby variation in the molecular weight of the silanol-group-containing polysiloxane is suppressed. Thus, the storage stability of the silanol-group-containing-polysiloxane solution can be remarkably enhanced.

MODES FOR CARRYING OUT THE INVENTION

In the method of the present invention for stabilizing a silanol-group-containing-polysiloxane solution, a silanol-group-containing-polysiloxane solution containing a silanol-group-containing polysiloxane is treated with a cation exchange resin in the presence of an alcohol solvent.

No particular limitation is imposed on the silanol-group-containing-polysiloxane solution to be treated in the present invention, so long as the solution contains a polysiloxane having a silanol group (≡Si—OH). Examples of the polysiloxane having a silanol group include polysiloxane formed through polycondensation of one or more alkoxysilanes, which are an alkoxy-group-having siloxane or silane. Specific examples of the silanol-group-containing polysiloxane include polysiloxanes formed through polycondensation of one or more alkoxysilanes, which are selected from among tetraalkoxysilanes such as tetramethoxysilane, tetraethoxysilane, tetrapropoxysilane, and tetrabutoxysilane; trialkoxysilanes such as methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, vinyltrimethoxysilane, vinyltriethoxysilane, 3-isocyanatopropyltrimethoxysilane, 3-isocyanatopropyltriethoxysilane, 3-aminopropyltrimethoxysilane, 3-aminopropyltriethoxysilane, γ-glycidoxypropyltrimethoxysilane, γ-glycidoxypropyltriethoxysilane, γ-mercaptopropyltrimethoxysilane, γ-mercaptopropyltriethoxysilane, 3-acryloxypropyltrimethoxysilane, 3-acryloxypropyltriethoxysilane, γ-methacryloxypropyltrimethoxysilane, γ-methacryloxypropyltriethoxysilane, γ-ureidopropyltrimethoxysilane, and γ-ureidopropyltriethoxysilane; dialkoxysilanes such as dimethyldimethoxysilane, dimethyldiethoxysilane, diphenyldimethoxysilane, diphenyldiethoxysilane, methylphenyldimethoxysilane, and methylphenyldiethoxysilane; perfluoroalkyl-group-having alkoxysilanes such as trifluoropropyltrimethoxysilane, trifluoropropyltriethoxysilane, tridecafluorooctyltrimethoxysilane, tridecafluorooctyltriethoxysilane, heptadecafluorodecyltrimethoxysilane, and heptadecafluorodecyltriethoxysilane.

No particular limitation is imposed on the reaction solvent used in polycondensation of the alkoxysilane(s). Examples of the reaction solvent include water and a polar solvent that is miscible with water at an arbitrary ratio, and examples of the polar solvent include ketones such as acetone, methyl ethyl ketone, and methyl isobutyl ketone; ethers such as diethyl ether and tetrahydrofuran; alcohols such as methanol, ethanol, and isopropanol; glycols such as ethylene glycol and propylene glycol; amides such as N,N-dimethylformamide and N-methyl-2-pyrrolidone; and dimethylsulfoxide. These solvents may be used singly or in combination of two or more species.

In the present invention, a polycondensation catalyst is preferably used in polycondensation of an alkoxysilane or alkoxysilanes. Examples of the polycondensation catalyst include acid catalysts such as hydrochloric acid. In the present invention, the polycondensation catalyst is removed before treatment with a cation exchange resin.

Examples of the solvent for producing the silanol-group-containing-polysiloxane solution include the same solvents as the reaction solvents employed in polycondensation of the aforementioned alkoxysilane(s) and propylene glycol monomethyl ether acetate. In the case where the polycondensation reaction solvent or the solvent formed via polycondensation is a solvent targeted to the silanol-group-containing-polysiloxane solution, the solution obtained through polycondensation reaction may be employed as a silanol-group-containing-polysiloxane solution, without any further treatment. Also, in consideration of possible hazards of the solvent such as inflammability, a solvent having a lower hazard may be used. That is, the polycondensation reaction solvent or the solvent formed via polycondensation may be changed to another solvent other than the polycondensation reaction solvent or the solvent formed via polycondensation (e.g., propylene glycol monomethyl ether acetate).

Examples of the alcohol solvent which is caused to be present in the treatment of the silanol-group-containing-polysiloxane solution with a cation exchange resin include monoalcohol solvents such as methanol, ethanol, n-propanol, i-propanol, n-butanol, i-butanol, sec-butanol, t-butanol, n-pentanol, i-pentanol, 2-methylbutanol, sec-pentanol, t-pentanol, 3-methoxybutanol, n-hexanol, 2-methylpentanol, sec-hexanol, 2-ethylbutanol, methyl isobutyl carbinol, sec-heptanol, 3-heptanol, n-octanol, 2-ethylhexanol, sec-octanol, n-nonyl alcohol, 2,6-dimethyl-4-heptanol, n-decanol, sec-undecyl alcohol, trimethylnonyl alcohol, sec-tetradecyl alcohol, sec-heptadecyl alcohol, phenol, cyclohexanol, methylcyclohexanol, 3,3,5-trimethylcyclohexanol, benzyl alcohol, phenyl methyl carbinol, diacetone alcohol, cresol, methyl hydroxyacetate, ethyl hydroxyacetate, ethyl 2-hydroxypropionate, ethyl 2-hydroxy-2-methylpropionate, and methyl 2-hydroxy-3-methylbutyrate; polyhydric alcohol solvents such as ethylene glycol, propylene glycol, 1,3-butylene glycol, 2,4-pentanediol, 2-methyl-2,4-pentanediol, 2,5-hexanediol, 2,4-heptanediol, 2-ethyl-1,3-hexanediol, diethylene glycol, dipropylene glycol, triethylene glycol, tripropylene glycol, and glycerin; and polyhydric alcohol monoether solvents such as ethylene glycol monomethyl ether, ethylene glycol monoethyl ether, ethylene glycol mono-n-butyl ether, ethylene glycol mono-n-hexyl ether, ethylene glycol monophenyl ether, ethylene glycol mono-2-ethylbutyl ether, diethylene glycol monomethyl ether, diethylene glycol monoethyl ether, diethylene glycol mono-n-butyl ether, diethylene glycol mono-n-hexyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tirpropylene glycol monomethyl ether. Among them, polyhydric alcohol mono ether solvents are preferred, from the viewpoint of solubility of silanol-group-containing polysiloxane. These alcohol solvents may be used singly or in combination of two or more species.

Notably, so long as the effect of the present invention is not impaired, one or more additional solvents (including water) may be used along with the alcohol solvent(s). Examples of such additional solvents include aliphatic hydrocarbon solvents such as n-pentane, i-pentane, n-hexane, i-hexane, n-heptane, i-heptane, 2,2,4-trimethylpentane, n-octane, i-octane, cyclohexane, and methylcyclohexane; aromatic hydrocarbon solvents such as benzene, toluene, xylene, ethylbenzene, trimethylbenzene, methylethylbenzene, n-propylbenzene, i-propylbenzene, diethylbenzene, butylbenzene, triethylbenzene, di-i-propylbenzene, n-amylnaphthalene, and trimethylbenzene; ketone solvents such as acetone, methyl ethyl ketone, methyl n-propyl ketone, methyl n-butyl ketone, diethyl ketone, methyl i-butyl ketone, methyl n-pentyl ketone, ethyl n-butyl ketone, methyl n-hexyl ketone, di-i-butyl ketone, trimethylnonanone, cyclopentanone, cyclohexanone, methylcyclohexanone, 2,4-pentanedione, acetonylacetone, diacetone alcohol, acetophenone, and FENCHONE; ether solvents such as ethyl ether, i-propyl ether, n-butyl ether, n-hexyl ether, 2-ethylhexyl ether, ethylene oxide, 1,2-propylene oxide, dioxolane, 4-methyldioxolane, dioxane, dimethyldioxane, ethylene glycol diethyl ether, ethylene glycol dibutyl ether, diethylene glycol dimethyl ether, diethylene glycol diethyl ether, diethylene glycol dipropyl ether, diethylene glycol di-n-butyl ether, propylene glycol dimethyl ether, propylene glycol diethyl ether, propylene glycol dipropyl ether, diethylene glycol dibutyl ether, ethoxytriglycol, tetraethylene glycol di-n-butyl ether, tetrahydrofuran, and 2-methyltetrahydrofuran; ester solvents such as diethyl carbonate, methyl formate, ethyl formate, propyl formate, isopropyl formate, butyl formate, isobutyl formate, amyl formate, isoamyl formate, methyl acetate, ethyl acetate, γ-butyrolactone, γ-valerolactone, n-propyl acetate, i-propyl acetate, n-butyl acetate, i-butyl acetate, sec-butyl acetate, n-pentyl acetate, isopentyl acetate, sec-pentyl acetate, 3-methoxybutyl acetate, hexyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate, propylene glycol monoethyl ether acetate, propylene glycol monopropyl ether acetate, propylene glycol monobutyl ether acetate, dipropylene glycol monomethyl ether acetate, dipropylene glycol monoethyl ether acetate, glycol diacetate, methoxytriglycol acetate, ethyl propionate, n-butyl propionate, methyl propionate, ethyl propionate, propyl propionate, isopropyl propionate, butyl propionate, isobutyl propionate, i-amyl propionate, methyl butyrate, ethyl butyrate, butyl butyrate, isobutyl butyrate, diethyl oxalate, di-n-butyl oxalate, methyl lactate, ethyl lactate, n-propyl lactate, isopropyl lactate, n-butyl lactate, isobutyl lactate, n-amyl lactate, diethyl malonate, dimethyl phthalate, and diethyl phthalate; azo compound solvents such as N-methylformamide, N,N-dimethylformamide, N,N-diethylformamide, acetamide, N-methylacetamide, N,N-dimethylacetamide, N-methylpropionamide, and N-methylpyrrolidone; and sulfo compound solvents such as dimethyl sulfide, diethyl sulfide, thiophene, tetrahydrothiophene, dimethyl sulfoxide, sulfolane, and 1,3-propane sultone.

The alcohol solvent is added to the silanol-group-containing-polysiloxane solution before or during the treatment with a cation exchange resin. Alternatively, the solvent of the silanol-group-containing-polysiloxane solution may be changed to the alcohol solvent.

In the case where the solvent of the silanol-group-containing-polysiloxane solution is an alcohol solvent, no further alcohol solvent must be added to the silanol-group-containing-polysiloxane solution to be treated with a cation exchange resin. In this case, the silanol-group-containing-polysiloxane solution may be directly treated with a cation exchange resin. Needless to say, an additional alcohol solvent may be added to the silanol-group-containing-polysiloxane solution. No particular limitation is imposed on the ratio of the amount of the solvent of the silanol-group-containing-polysiloxane solution to that of the alcohol solvent which is caused to be present during the treatment of the silanol-group-containing-polysiloxane solution with a cation exchange resin. In one case, the ratio by mass of the solvent of the silanol-group-containing-polysiloxane solution to the alcohol solvent which is caused to be present during the treatment of the silanol-group-containing-polysiloxane solution with a cation exchange resin is adjusted to about 1:1 to 99.

Subsequently, the thus-prepared solution is treated with a cation exchange resin. Through treatment of the silanol-group-containing-polysiloxane solution with a cation exchange resin in the presence of an alcohol solvent, variation in molecular weight of the silanol-group-containing polysiloxane can be suppressed, as compared with the case where the solution is not treated with a cation exchange resin in the presence of an alcohol solvent. Thus, the stability of the silanol-group-containing-polysiloxane solution can be remarkably enhanced. The reason why the silanol-group-containing-polysiloxane solution can be considerably stabilized through the stabilization method of the present invention has not been completely elucidated. However, one conceivable reason is that the cation exchange resin serves as a catalyst with respect to capping of the silanol moiety, which is an active site of the silanol-group-containing polysiloxane, with the alcohol solvent. In contrast, even when the silanol-group-containing-polysiloxane solution is treated with an anion exchange resin in the presence of alcohol, the silanol-group-containing polysiloxane cannot be stabilized to an extent attained by the present invention.

No particular limitation is imposed on the type of the cation exchange resin, and either a strongly acidic cation exchange resin or a weakly acidic cation exchange resin may be used. A generally employed commercial hydrogen-type cation exchange resin may be used. Examples thereof include Amberlist (registered trademark, Organo Co.), Diaion (registered trademark, Mitsubishi Chemical Co.), and Monosphere (registered trademark, Dow Chemical Co.). However, the cation exchange resin preferably has a low water content, for example, 9 mass % or less, more preferably 7 mass % or less. When the water content of the cation exchange resin is high, the molecular weight of the silanol-group-containing polysiloxane tends to vary, and the effect of stabilizing the silanol-group-containing-polysiloxane solution becomes poor. Such a high water content is conceived to shift the equilibrium from the stable alkoxysilane side to the unstable silanol side. A cation exchange resin having low water content may be produced through washing a hydrous cation exchange resin with an alcohol such as an alcohol solvent which is caused to be present in the treatment of the cation exchange resin.

Examples of the method for treating the silanol-group-containing-polysiloxane solution with a cation exchange resin include a technique in which the silanol-group-containing-polysiloxane solution is allowed to flow a column filled with a cation exchange resin, and a technique in which a cation exchange resin is added to the silanol-group-containing-polysiloxane solution under stirring. In the latter technique, the added cation exchange resin is removed through filtration or the like, after completion of the treatment.

The amount of the cation exchange resin is preferably 5 parts by mass to 80 parts by mass, with respect to 100 parts by mass of the silanol-containing polysiloxane, more preferably 10 parts by mass to 50 parts by mass.

The amount of the alcohol solvent caused to be present is preferably 1 to 99 parts by mass, with respect to 1 part by mass of the silanol-containing polysiloxane.

The temperature at which the cation exchange resin treatment is preformed is preferably 0° C. to 50° C., more preferably 5° C. to 25° C.

The duration of time for which the cation exchange resin treatment is preformed is 5 minutes to 24 hours, more preferably 1 hour to 10 hours.

In the Examples of Patent Document 3, polycondensation of an alkoxysilane was performed in the presence of a hydrous H-type cation exchange resin as a catalyst. The hydrous H-type cation exchange resin was added to an alkoxysilane solution, and the mixture was allowed to stand for 2 to 7 days. However, in Patent Document 3, the hydrous H-type cation exchange resin was present during polycondensation of an alkoxysilane (monomer) and essentially serves as an alkoxysilane polycondensation catalyst. The molecular weight of the thus-produced alkoxysilane polymer (polysiloxane) is thought to vary continuously. In contrast, according to the present invention, the silanol-group-containing polysiloxane itself is treated with a cation exchange resin. In other words, the polymer formed through polycondensation is treated with a cation exchange resin. Thus, the invention of Patent Document 3 differs from the present invention; i.e., in Patent Document 3, the silanol-group-containing polysiloxane solution is not treated with a cation exchange resin. In addition, the phenomenon observed in the present invention is not reproduced through allowing the mixture of Patent Document 3 to stand for 2 to 7 days. Also, Patent Document 3 discloses that stabilization of polysiloxane is assessed by occurrence of gelation. However, no occurrence of gelation does not always mean that the molecular weight of the polysiloxane is unchanged.

Patent Document 3 also discloses in the Examples that an ion exchange resin having high water content is an essential element. That is, in Patent Document 3, the raw material alkoxysilane monomers must be hydrolyzed in polycondensation. In contrast, as described above, according to the present invention, the silanol-group-containing polysiloxane formed through polycondensation is treated with a cation exchange resin. Thus, addition of water is not required, or a cation exchange resin substantially containing no water may be used.

Accordingly, through treatment of the silanol-group-containing-polysiloxane solution with a cation exchange resin in the presence of an alcohol solvent, variation in molecular weight of the silanol-group-containing polysiloxane is suppressed, whereby the storage stability of the silanol-group-containing-polysiloxane solution can be enhanced. That is, a stabilized silanol-group-containing-polysiloxane solution is produced. Since no substantial variation occurs in the molecular weight of the thus-produced stabilized silanol-group-containing-polysiloxane solution after a long period of time, the polysiloxane solution can be suitably used even after storage or transportation.

EXAMPLES

The present invention will next be described in detail by way of examples, which should not be construed as limiting the invention thereto.

Examples 1 to 4 and Comparative Example 1

To a 3000-mL four-neck flask, tetraethoxysilane (TEOS) (601.5 g, 2,887 mmol), methyltriethoxysilane (MTEOS) (273.6 g, 1,333 mmol), phenyltrimethoxysilane (PhTMOS) (44.1 g, 222 mmol), and acetone (1,324 g) were added, and the mixture was cooled to 10° C. under stirring by means of stirring blades. To the mixture, 0.01N hydrochloric acid (292.2 g) was added at 10 to 20° C. over 20 minutes, and the resultant mixture was heated to 62° C., followed by stirring for 4 hours, to form a solution. While PGMEA (propylene glycol monomethyl ether acetate) (1,766 g) was added to the solution, the mixture was concentrated under reduced pressure at 40 to 60° C., whereby acetone, hydrogen chloride, water, ethanol, and methanol were substituted by PGMEA. Thus, 806.3 g of a solution of silanol-group-containing polysiloxane in PGMEA was yielded. Through the above substitution, hydrochloric acid serving as a polycondensation catalyst was also removed. The silanol-group-containing polysiloxane in PGMEA solution was diluted with PGME (propylene glycol monomethyl ether) (1,021.3 g), to thereby form a PGME/PGMEA solution of the silanol-group-containing polysiloxane. The silanol-group-containing polysiloxane in PGME/PGMEA solution was employed as a polymer solution of Comparative Example 1.

Subsequently, the silanol-group-containing polysiloxane in PGME/PGMEA solution was treated with a cation exchange resin under the conditions specified in Table 1. Before use, the cation exchange resin was washed with PGME, to thereby adjust the water content to 7 mass %. The amount of the cation exchange resin was adjusted to 20 mass % with respect to the amount of the silanol-group-containing polysiloxane in PGME/PGMEA solution. In the treatment of the silanol-group-containing polysiloxane in PGME/PG-MEA solution with the cation exchange resin, the cation exchange resin was added to the solution, and the mixture was stirred for 4 hours. After completion of the treatment, the cation exchange resin was removed through filtration, to thereby yield polymer solutions (stabilized silanol-group-containing-polysiloxane solutions) of Examples 1 to 4.

The polymer solutions produced in Examples 1 to 4 and Comparative Example 1 were maintained at room temperature (23° C.) for 7 days. The molecular weight of the silanol-group-containing polysiloxane in each polymer solution was measured immediately after production of the polymer solution (denoted by "day 0" in Table 1) and 7 days after the production (denoted by "day 7" in Table 1). The percent increase (day 7/day 0) was also calculated. Table 1 shows the results.

TABLE 1

|  | Cation exchange resin treatment conditions | | Mol. wt. (Mw) after storage at room temp. | | Increase in mol. wt. (Mw) |
| --- | --- | --- | --- | --- | --- |
|  | Cation exchange resin | Treatment temp. | Day 0 | Day 7 | (7 days) |
| Ex. 1 | Amberlyst 15JWET | 7° C. | 1,420 | 1,460 | 3% |
| Ex. 2 | Amberlyst 15JWET | 23° C. | 1,440 | 1,490 | 3% |

TABLE 1-continued

| | Cation exchange resin treatment conditions | | Mol. wt. (Mw) after storage at room temp. | | Increase in mol. wt. (Mw) |
|---|---|---|---|---|---|
| | Cation exchange resin | Treatment temp. | Day 0 | Day 7 | (7 days) |
| Ex. 3 | Monosphere 650C | 7° C. | 1,410 | 1,470 | 4% |
| Ex. 4 | Monosphere 650C | 23° C. | 1,420 | 1,470 | 4% |
| Comp. Ex. 1 | not treated | not treated | 1,440 | 2,090 | 45% |

Amberlyst 15JWET (registered trademark): H-type cation exchange resin (Organo Co.)
Monosphere 650C (registered trademark): H-type cation exchange resin (Dow Chemical Co.)

Example 5 and Comparative Example 2

To a 1000-mL four-neck flask, tetraethoxysilane (TEOS) (185.1 g, 888.4 mmol) and acetone (264.9 g) were added, and the mixture was cooled to 10° C. under stirring by means of stirring blades. To the mixture, 0.01N hydrochloric acid (58.43 g) was added at 10 to 20° C. over 20 minutes, and the resultant mixture was heated to 62° C., followed by stirring for 4 hours, to form a solution. While PGMEA (353.3 g) was added to the solution, the mixture was concentrated under reduced pressure at 40 to 60° C., whereby acetone, hydrogen chloride, water, and ethanol were substituted by PGMEA. Thus, 159.4 g of a solution of silanol-group-containing polysiloxane in PGMEA was yielded. Through the above substitution, hydrochloric acid serving as a polycondensation catalyst was also removed. The silanol-group-containing polysiloxane in PGMEA solution was diluted with PGME (197.3 g), to thereby form a PGME/PGMEA solution of the silanol-group-containing polysiloxane. The silanol-group-containing polysiloxane in PGME/PGMEA solution was employed as a polymer solution of Comparative Example 2.

Subsequently, the silanol-group-containing polysiloxane in PGME/PGMEA solution was treated with a cation exchange resin under the conditions specified in Table 2. Before use, the cation exchange resin was washed with PGME, to thereby adjust the water content to 7 mass %. The amount of the cation exchange resin was adjusted to 20 mass % with respect to the amount of the silanol-group-containing polysiloxane in PGME/PGMEA solution. In the treatment of the silanol-group-containing polysiloxane in PGME/PGMEA solution with the cation exchange resin, the cation exchange resin was added to the solution, and the mixture was stirred for 4 hours. After completion of the treatment, the cation exchange resin was removed through filtration, to thereby yield a polymer solution (a stabilized silanol-group-containing-polysiloxane solution) of Example 5.

The polymer solutions produced in Example 5 and Comparative Example 2 were maintained at room temperature (23° C.) for 6 days. The molecular weight of the silanol-group-containing polysiloxane in each polymer solution was measured immediately after production of the polymer solution (denoted by "day 0" in Table 2), 2 days after the production (denoted by "day 2" in Table 2), and 6 days after the production (denoted by "day 6" in Table 2). The percent increase (day 6/day 0) was also calculated. Table 2 shows the results.

Example 6 and Comparative Example 3

To a 1000-mL four-neck flask, tetraethoxysilane (TEOS) (129.6 g, 621.9 mmol), methyltriethoxysilane (MTEOS) (39.6 g, 222.1 mmol), phenyltrimethoxysilane (PhTMOS) (8.64 g, 43.5 mmol), N-(3-(triethoxysilyl)propyl)benzenesulfonamide (0.32 g, 0.89 mmol), and acetone (267.2 g) were added, and the mixture was cooled to 10° C. under stirring by means of stirring blades. To the mixture, 0.01N hydrochloric acid (59.23 g) was added at 10 to 20° C. over 20 minutes, and the resultant mixture was heated to 62° C., followed by stirring for 4 hours, to form a solution. While PGMEA (356.2 g) was added to the solution, the mixture was concentrated under reduced pressure at 40 to 60° C., whereby acetone, hydrogen chloride, water, and ethanol were substituted by PGMEA. Thus, 160.4 g of a solution of silanol-group-containing polysiloxane in PGMEA was yielded. Through the above substitution, hydrochloric acid serving as a polycondensation catalyst was also removed. The silanol-group-containing polysiloxane in PGMEA solution was diluted with PGEE (propylene glycol monoethyl ether) (367.3 g), to thereby form a PGEE/PGMEA solution of the silanol-group-containing polysiloxane. The silanol-group-containing polysiloxane in PGEE/PGMEA solution was employed as a polymer solution of Comparative Example 3.

Subsequently, the silanol-group-containing polysiloxane in PGEE/PGMEA solution was treated with a cation exchange resin under the conditions specified in Table 3. Before use, the cation exchange resin was washed with PGME, to thereby adjust the water content to 7 mass %. The amount of the cation exchange resin was adjusted to 20 mass % with respect to the amount of the silanol-group-containing polysiloxane in PGEE/PGMEA solution. In the treatment of the silanol-group-containing polysiloxane in PGEE/PGMEA solution with the cation exchange resin, the cation exchange resin was added to the solution, and the mixture was stirred for 4 hours. After completion of the treatment, the cation exchange resin was removed through filtration, to thereby yield a polymer solution (a stabilized silanol-group-containing-polysiloxane solution) of Example 6.

The polymer solutions produced in Example 6 and Comparative Example 3 were maintained at room temperature (23° C.) for 6 days. The molecular weight of the silanol-group-containing polysiloxane in each polymer solution was measured immediately after production of the polymer solution (denoted by "day 0" in Table 3) and 6 days after the production (denoted by "day 6" in Table 3). The percent increase (day 6/day 0) was also calculated. Table 3 shows the results.

TABLE 2

| | Cation exchange resin treatment conditions | | Mol. wt. (Mw) after storage at room temp. | | | Increase in mol. wt. (Mw) |
|---|---|---|---|---|---|---|
| | Cation exchange resin | Treatment temp. | Day 0 | Day 2 | Day 6 | (6 days) |
| Ex. 5 | Amberlyst 15JWET | 7° C. | 2,110 | 2,170 | 2,300 | 9% |
| Comp. Ex. 2 | not treated | not treated | 2,300 | 3,870 | 6,670 | 190% |

Amberlyst 15JWET (registered trademark): H-type cation exchange resin (Organo Co.)

TABLE 3

|  | Cation exchange resin treatment conditions | | Mol. wt. (Mw) after storage at room temp. | | Increase in mol. wt. (Mw) |
| --- | --- | --- | --- | --- | --- |
|  | Cation exchange resin | Treatment temp. | Day 0 | Day 6 | (6 days) |
| Ex. 6 | Amberlyst 15JWET | 7° C. | 1,460 | 1,520 | 4% |
| Comp. Ex. 3 | not treated | not treated | 1,500 | 1,740 | 16% |

Amberlyst 15JWET (registered trademark): H-type cation exchange resin (Organo Co.)

As is clear from Tables 1 to 3, the polysiloxane solution of Examples 1 to 6, which had been produced through treating the corresponding silanol-group-containing polysiloxane with a cation exchange resin in the presence of an alcohol solvent, exhibited no substantial change in the molecular weight of the silanol-group-containing polysiloxane, after storage for 7 days or 6 days. In contrast, the polysiloxane solution of Comparative Examples 1 to 3, which had been produced without the treatment with a cation exchange resin, exhibited considerable increase in molecular weight, as compared with Examples 1 to 6. In this case, no stable polymer solution was yielded.

INDUSTRIAL APPLICABILITY

The present invention is industrially advantageous, since storage stability of a silanol-group-containing-polysiloxane solution useful for producing an anti-reflection film or the like can be remarkably enhanced.

The invention claimed is:

1. A method for stabilizing a silanol-group-containing-polysiloxane solution, which method comprises
treating a silanol-group-containing-polysiloxane solution containing a silanol-group-containing polysiloxane with a cation exchange resin in the presence of a polyhydric alcohol monoether solvent.

2. A method for stabilizing a silanol-group-containing-polysiloxane solution according to claim 1, wherein the polyhydric alcohol monoether solvent is propylene glycol monoalkyl ether.

3. A method for stabilizing a silanol-group-containing-polysiloxane solution according to claim 1, wherein the polyhydric alcohol monoether solvent is at least one species selected from among propylene glycol monomethyl ether and propylene glycol monoethyl ether.

4. A method for producing a stabilized silanol-group-containing-polysiloxane solution, which method comprises
treating a silanol-group-containing-polysiloxane solution containing a silanol-group-containing polysiloxane with a cation exchange resin in the presence of a polyhydric alcohol monoether solvent.

5. A stabilized silanol-group-containing-polysiloxane solution, which solution is produced by treating a silanol-group-containing-polysiloxane solution containing a silanol-group-containing polysiloxane with a cation exchange resin in the presence of a polyhydric alcohol monoether solvent.

* * * * *